US011500365B2

(12) United States Patent
Yarmus et al.

(10) Patent No.: US 11,500,365 B2
(45) Date of Patent: Nov. 15, 2022

(54) ANOMALY DETECTION USING MSET WITH RANDOM PROJECTIONS

(71) Applicant: Oracle International Corporation, Redwood Shores, CA (US)

(72) Inventors: Joe Yarmus, Groton, MA (US); Boriana Milenova, Reading, MA (US)

(73) Assignee: Oracle International Corporation, Redwood Shores, CA (US)

( * ) Notice: Subject to any disclaimer, the term of this patent is extended or adjusted under 35 U.S.C. 154(b) by 63 days.

(21) Appl. No.: 16/948,337

(22) Filed: Sep. 14, 2020

(65) Prior Publication Data
US 2021/0080939 A1 Mar. 18, 2021

Related U.S. Application Data

(60) Provisional application No. 62/900,580, filed on Sep. 15, 2019.

(51) Int. Cl.
*G05B 23/02* (2006.01)
(52) U.S. Cl.
CPC ....... *G05B 23/0254* (2013.01); *G05B 23/024* (2013.01); *G05B 23/0283* (2013.01)
(58) Field of Classification Search
CPC .............. G05B 23/0254; G05B 23/024; G05B 23/0283; G05B 23/0221
See application file for complete search history.

(56) References Cited

U.S. PATENT DOCUMENTS

| | | | |
|---|---|---|---|
| 2008/0027591 A1* | 1/2008 | Lenser ................ | G05D 1/0297 701/28 |
| 2019/0310617 A1* | 10/2019 | Li ......................... | G06F 11/008 |
| 2021/0212582 A1* | 7/2021 | Fathieh ................ | A61B 5/7275 |
| 2022/0012874 A1* | 1/2022 | Maier-Hein ........... | G06T 7/254 |

OTHER PUBLICATIONS

McDonald, J., "Multiple comparisons," Handbook of Biological Statistics, dated Jul. 20, 2015, URL: http://www.biostathandbook.com/multiplecomparisons.html.
D. Achlioptas, Database-friendly random projections, PODS '01 Proceedings of the twentieth ACM SIGMOD-SIGACT-SIGART symposium on Principles of database systems, pp. 274-281, dated 2003.
W. B. Johnson and J. Lindenstrauss. Extensions of Lipschitz mappings into a Hilbert space, Conference in modern analysis and probability, 189-206, Amer. Math. Soc., 1984.
M. P. Fay, H. Kim and M. Hachey, "On Using Truncated Sequential Probability Ratio Test Boundaries for Monte Carlo Implementation of Hypothesis Tests," J Computer Graph Stat. 2007; 16(4): 946-967.
Gross, K., et al., "Machine Learning Innovation for High Accuracy Remaining Useful Life (RUL) Estimation for Critical Assets in IoT Infrastructures," Int'l Conf. Internet Computing and Internet of Things, Copyright 2018.

(Continued)

*Primary Examiner* — Mohammad K Islam
(74) *Attorney, Agent, or Firm* — Vista IP Law Group, LLP (57) ABSTRACT

Disclosed is an approach to implement improved anomaly detection. Improved anomaly detection is provided using MSET-SPRT via Monte Carlo simulation that can address problems with conventional MSET-SPRT approaches and provide improved system performance and accuracy.

37 Claims, 6 Drawing Sheets

(56) References Cited

OTHER PUBLICATIONS

K. C. Gross, R. M. Singer, S. W. Wegerich, J. P. Herzog, R. VanAlstine, and F. Bockhorst., "Application of a Model-based Fault Detection System to Nuclear Plant Signals, Proceedings," Intelligent System App. to Power Systems (ISAP '97), Seoul, Korea, Jul. 6-10, 2001.

Masoumi, T., et al., "SimSPRT-II: Monte Carlo Simulation of Sequential Probability Ratio Test Algorithms for Optimal Prognostic Performance," International Conference on Computational Science and Computational Intelligence, 2016.

Gross, K. "Advanced Statistical Machine Learning for Prognostic Cyber Security and IoT Applications," Oracle Labs, Copyright 2015.

* cited by examiner

000# ANOMALY DETECTION USING MSET WITH RANDOM PROJECTIONS

CROSS-REFERENCE TO RELATED APPLICATIONS

The present application claims the benefit of U.S. Provisional Application No. 62/900,580, filed on Sep. 15, 2019, which is hereby incorporated by reference in its entirety.

BACKGROUND

Anomaly detection is often performed upon a set of data to identify circumstances where it would be appropriate to generate an alert or some other sort of notification when the set of data includes content that deviates too much from what is expected or predicted for that content. Anomaly detection can be applied in numerous types of fields in vast numbers of domains, such as for example, cyber security and IoT applications, industrial process control such as mechanical fault detection, early warning systems for nuclear power plants, as well as NASA's space shuttle and commercial airlines.

The problem is that vast quantities of data may be generated for analysis, which may result in intractable amounts of processing that is required to perform the anomaly detection. For example, consider an IoT installation where sensors are being monitored for anomaly detection purposes. Conventional approaches to perform anomaly detection would not have a problem if only a small number of sensors are producing data that need to be analyzed. However, in a situation where there may be a very large number of sensors, this may result in extreme volumes of data and processing that need to occur for anomaly detection, which may result in inefficient or erroneous analyses results if shortcuts or incorrect assumptions in the analysis are taken, or excessive analysis latency if the full conventional analysis is performed.

Therefore, there is a need for an improved approach to perform anomaly detection that addresses the issues identified above.

SUMMARY

Embodiments of the present invention provide a method, a computer program product, and a computer system to implement improved anomaly detection using MSET-SPRT via Monte Carlo Simulation.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Before describing embodiments of the invention, it is helpful at this time to provide some background regarding an approach to perform data analysis called the Multivariate State Estimation Technique (MSET), which is often used in conjunction with a Sequential Probability Ratio Test (SPRT). MSET has been applied to anomaly detection in numerous domains. In determining whether the performance parameters have deviated from predicted values, SPRT may also be used.

MSET is a nonlinear, nonparametric anomaly detection machine learning technique that calibrates the expected behavior of a system based on historical data from the normal operational sequence of monitored signals. It incorporates the learned behavior of a system into a persistent model that represents the normal estimated behavior. One can deploy the model to evaluate a subsequent stream of live signal vectors using various scoring functions. To form a hypothesis as to the overall health of the system, these functions calculate the difference between the estimated and the actual signal values (residuals) and use SPRT calculations to determine whether any of the signals have become degraded.

To build a good model, MSET requires sufficient historical data that adequately captures all normal modes of behavior of the system. Incomplete data results in false alerts when the system enters a mode of operation that was poorly represented in the historical data. MSET assumes that the characteristics of the data being monitored do not change over time. Once deployed, MSET is a stationary model and does not evolve as it monitors a data stream. Both MSET and SPRT operate on continuous time-ordered sensor data. If the raw data stream needs to be pre-processed or sampled, then this should be performed before the data is passed to the MSET-SPRT model. The MSET-SPRT algorithm is a type of a classification machine learning function, which generates a model in which each data row is labeled as either normal or anomalous. For anomalous predictions, the prediction details provide a list of the sensors that show the anomaly and a weight.

While conventional MSET-SPRT approaches may work well for systems having small numbers of sensors, both performance and accuracy problems may occur if conventional MSET-SPRT techniques are applied to systems having large numbers of sensors. To explain, consider that each sensor is a dimension in an MSET model. Thus, when there are large numbers of sensors, the MSET models can become very high dimensional. At any given time, the array of sensors produces a vector of values. To detect whether that vector of values is anomalous, MSET compares that vector to vectors that represent normal system operation. The number of comparison vectors, required for a good model, is greater than the number of sensors. Thus, the computation is quadratic in the number of sensors. Quadratic computation can be excessively slow in an online, streaming application.

In addition, since each sensor is subjected to a hypothesis test, a large number of sensors implies a large number of hypothesis tests. Performing a large number of hypothesis tests is a known statistical problem, which can result in a false positive, false negative trade-off. For example, if a test has a 5% chance of identifying the behavior of a sensor as anomalous, when it is, in fact, normal, then, when 1000 tests are performed (on 1000 sensors), on average 50 sensors will wrongly alert as anomalous. These are false positives. The test criteria can be made more stringent, by reducing the false positive rate from 5% to, for example, 0.05%, but then many more anomalies would be missed by the test process. The misses are false negatives.

Embodiments of the present invention provide a method, a computer program product, and a computer system to implement improved anomaly detection using MSET-SPRT via Monte Carlo simulation that can address these problems with conventional MSET-SPRT approaches and provide improved system performance and accuracy.

The invention provides a novel combination of elements that together provide a significantly improved approach to implement MSET especially in the presence of large numbers of sensors, including some or all of the steps of: (a) consolidating a per-feature statistical analysis into one or more global or regional aggregates; (b) using random projection to reduce the dimensionality of the data into a global or region aggregates and to, simultaneously, interpret the projections as generated Monte Carlo estimates of the aggregates; and (c) using the Monte Carlo simulation to vastly improve performance, to reduce type 1 and type 2 errors (as discussed in more detail below), and compute aggregate diagnostics that are otherwise intractable. This sequence highlights the novel concept of the interpretation of random projection as a Monte Carlo simulation. With that interpretation, it becomes possible to solve problems that cannot be solved any other way. Consider trying to find anomalies in the stream of values coming from a large group of sensors over a small window. Anomalous values of a sensor are values which differ from what would be predicted based on the corresponding values of the other sensors. In general, one does not know the relative importance of the individual sensors to the prediction, or, even, which sensors are important to the prediction.

The MSET algorithm is a non-linear kernel estimator that predicts a vector of values. The vector is an array of sensor values. The prediction is based on a similarity to a "kernel" of selected prior vectors chosen from historical data. As the predictor of a vector, MSET is a multi-target algorithm. Alternatively, it can be considered a family of single target models, where each single target is an element of the target vector.

The goal of MSET is to identify anomalies in the stream of sensor values. For that purpose, it considers running sums of model residuals (differences between predicted and actual values). MSET expects the direction of deviations to be random in a healthy system, but to be directional, e.g., the signal is growing larger and larger than expected or smaller and smaller than expected, in a system that is in trouble.

MSET uses hypothesis testing to identify anomalies. Hypothesis testing is a statistical procedure for identifying whether a condition holds. Hypothesis testing has a null hypothesis and an alternate hypothesis. For MSET, the null hypothesis is that the streaming values of a sensor are within normal range. The alternate hypothesis is that the sensor values indicate a problem is occurring. MSET alerts when the statistics indicate the alternate hypothesis holds.

To reduce the number of false alerts, MSET uses two approaches. First, MSET uses SPRT (sequential probability ratio test) which calculates boundaries in the accumulated residual sequence that meet two thresholds on the probability of alternative and the null hypothesis. One threshold accepts the null hypothesis, and another one accepts the alternate hypothesis. The boundaries are computed from a ratio of nominal probability thresholds (hence the name SPRT). When that ratio favors the either threshold, the accumulated residual sequence is set to 0.

Random accumulations of an unending stream, if unchecked, will grow arbitrarily large in both directions. Resetting the accumulation to 0 prevents this. Secondly MSET uses windowing, requiring a sequence of alternate hypothesis conditions to occur before alerting. For example, a window of 5 with 3 alternate hypothesis conditions.

However, a single model, regardless of how it is computed, represents a single weighting of the relative importance of the predictors (other sensors) conditional on the predictor values. A single model makes a single prediction for a given row of predictor values. Recall that MSET can be considered a family of single models.

Correlation between predictor and target is never perfect. Each predictor is a source of error. Every source of error makes it harder to detect anomalies, because anomalies must be distinguished from errors in prediction. Failure to detect anomalous behavior, when it exists is called type 2 error. To counteract type 2 error, the alert threshold could be lowered. Lowering the alert threshold, causes many false alerts (type 1 error).

A random projection of sensor values is a randomly-weighted sum of sensor values. The random weights randomize the relative influence of each sensor on the sum. The summation transforms a vector of values into a single value. The sum is a measure of global health. A collection of random projections represents a collection of relative importance weights. A sensor with little relative importance to a prediction might have an out-of-proportional influence on the prediction of a single model (single weighting), but is unlikely to have undue influence on a collection of weightings.

MSET built on the vector of sensor values builds a family of single models. MSET built on random projections builds an ensemble Monte Carlo model of global health. SPRT and windowing on the original values produce a single statistical condition (alert/no alert), a single Bernoulli trial. SPRT and windowing on randomly projected sensor values produces a fixed boundary, valid p-value ordering of Monte Carlo estimates of global health which justifies treatment of the hypotheses as a collection of Bernoulli trials subject to a Binomial test.

A fixed boundary SPRT compares the resampling risk to type 1 ($\alpha$) and type 2 ($\beta$) threshold resampling risks (the boundaries). The truncated version of SPRT, the fixed boundary case, employs a maximum number of resamples. The number of resamples in the random projection version of MSET is the product of the number of number of random projections and the number of projected rows which is a constant. Thus, random projection MSET is fixed boundary truncated SPRT.

A binomial test has far more power than a single Bernoulli trial. For example, one can translate a 95% (1–$\alpha$) confidence level into a 5% nominal binomial p-value; for a window size of 5 consecutive measurements, with 50 random projections, generating 250 Bernoulli trials. Suppose 125 of those trials generate an alert. If the question is asked regarding what is the probability of observing 125 successes out of 250 trials if the probability of success is 0.05, the answer to computer precision is 0. The translation is that one can be extremely confident that the alert is not a false positive. This is an aggregate diagnostic not computable from the original MSET results.

One reason that the binomial test has far more power than the original MSET is that a randomly projected row is an aggregate (a sum of values). A model built on aggregates has far lower variance than a model built on individual values. Consider, one of the simplest models, the mean. The mean is constructed from the sum by dividing by the number of values in the sum. The variance of the mean $$\frac{1}{\sqrt{n}}$$

times the variance of the individual values.

In addition, because a random projection projects the collection of sensor values at a time instance to a single value, the hypothesis concerns global, or regional (if the sensors are divided into regions) health of a system and the number of hypotheses are vastly reduced. Every hypothesis test is subject to error (confidence level). If a hypothesis is tested at a confidence of 95%, then the expected number of false positives is 5%. For example, reducing the number of tests from 1000 to 5, reduces the expected number of false alerts from 20 to 0.25.

In addition to the base inventive concept described above, it is further noted that where the multidimensional features are sensor data, the inventive combination(s) may further include: (a) gathering the sensor data; (b) using random projection to reduce the sensor data from individual to global, or regional (by division of sensors into sensor regions) aggregate measures of system health; (c) building an MSET (Multivariate State Estimation Technique) on the random projections; (d) interpreting the collection of random projections as a fixed boundary, Monte Carlo simulation, that generates valid p-values for a binomial test of global or regional health; (e) performing hypothesis testing using a single global, or per-region, hypothesis; and (f) performing anomaly identification using a result of the hypothesis testing. In addition, the approach may include windowed, SPRT hypotheses concerning MSET model prediction of randomly projected sensor values that are subject binomial tests, at the nominal a level of significance, to identify global or regional anomalies. The random projection can be used to reduce the dimensionality of data used to generate the MSET model and reduce its computational cost.

Figure 1:
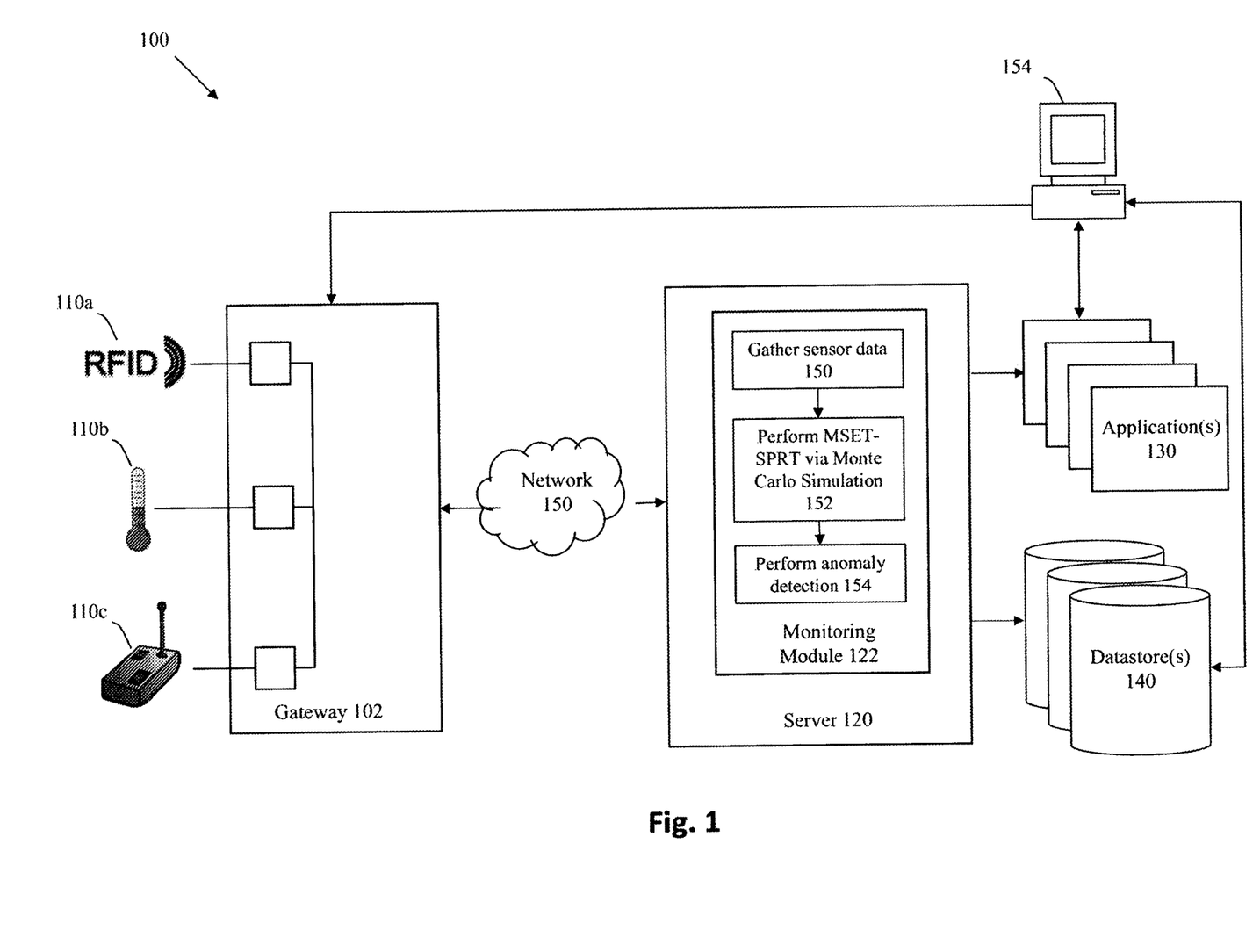
FIG. 1 illustrates a system for implementing some embodiments of the invention.

FIG. 1 provides an illustration of the invention being used in the context of an Internet of Things (IoT) system. The IoT concept refers to the interconnection of embedded components and sensors that provide an infrastructure for connectivity of devices, systems, and services. Due to the ubiquitous nature of connected objects in the IoT paradigm, large numbers of devices may be expected to be connected and providing data for analysis. In particular, recent technological advances have brought about an amazing change in the landscape for sensors. The sensors now exist in greater numbers than ever before and have become very inexpensive to build and purchase. In addition, it has become very easy to use sensors for a great number of different applications, such as measurement of temperature, humidity, $CO_2$ levels, GPS, water level, water presence, electrical current/voltage, light, presence, etc. There is almost nothing today that cannot be measured with a simple and cheap sensor. Many companies are now providing the infrastructure and services to form a connection to the various IoT components and sensors that have now been embedded in various devices. While the current embodiment is illustrated in the context of an IoT environment, it is noted that the inventive concept has wide applicability and is not limited in its scope only to IoT or sensor data unless expressly claimed as such.

A gateway 102 may be provided in some embodiments that has front-end data collection logic to collect data from the sensors, and a server portion 120 to perform back-end processing of the collected data. The gateway 102 comprises a sensor management controller that captures the sensor data, and collects the sensor data for transmission. In general, the gateway 102 performs data acquisition and management of local devices 110*a-c*. The local devices 110*a-c* may include any type of equipment that can be suitably managed by the system. For example, any number of sensors may be embedded within the local equipment at various sites. Examples of such sensors include RFID sensors at device 110*a*, temperature sensors at device 110*b*, and other types of smart devices, beacons, and/or machines at device 110*c*.

The local devices 110*a-c* can be configured to send data at regular intervals to the gateway 102. Such data may include information to be captured from the local devices. For example, information that may be captured include operating conditions, metrics, pressure, vibration, temperature, and/or flow rate. Some non-exhaustive examples of the uses for sensor data may include: (a) handling perishable goods, where the system continuously monitors the temperature, humidity and location of goods as they travel through the supply chain, where by monitoring these critical factors and taking quick action on alerts, one can significantly reduce the spoiled goods and as a result increase revenue; (b) managing heavy machinery, by tracking the locations of a company's equipment along with environment conditions and operating metrics of the equipment, thereby ensuring that the equipment is being operated properly, preventing machine failures, and ensuring that the equipment is being properly used to the organization's goods and services; and (c) providing product support, where products that are sold could communicate back to the maintenance organization with current status, diagnostic information, and available quantity of consumables, and where the provided information helps to deliver a better quality of service to customers by discovering potential failures before they impact the customer and also increase revenue through expanded service offerings and replenishment of consumables.

The data collected by the gateway 102 are sent over a network 150 to the server 120. The server 120 receives data from potentially a multitude of client gateways. In the present embodiment, the server 120 includes a monitoring module 122 (which may be implemented as an anomaly detection module in some embodiments) to perform monitoring and/or anomaly detection using the improved MSET approach.

In particular, in some embodiments of the invention, module 122 uses MSET-SPRT to leverage random projections to improve the scalability and robustness of the algorithm. In operation, sensor data is gathered at step 150. At step 152, MSET-SPRT is performed via Monte Carlo simulation, specifically using random projections as a technique to reduce dimensionality while preserving pairwise distances. By randomly projecting h sensor data, the problem s solved in a distance-preserving, lower-dimension space. The MSET hypothesis testing approach is applied on the projected data where each random projection can be viewed as a Monte Carlo simulation of system health.

In the current embodiment, the invention reduces the number of hypotheses tested from one per sensor (potentially thousands of hypotheses for thousands of sensors) to a single hypothesis test (one single hypothesis for the entire system of the thousands of sensors) by applying random projections to recast the problem as a question of the global system health. The current approach can therefore consider tSPRT (truncated SPRT) in a Monte Carlo setting, where in the Monte Carlo setting, the bootstrap samples become Bernoulli estimates of the hypothesis probability. The hypothesis is evaluated as a binomial distribution. Anomaly detection then occurs at step 154, with the overall probability of an anomaly follows a binomial distribution with the number of projections as the number of trials and the number of alerting projections as the number of successes. The NULL hypothesis is that the system behavior is normal and the alternate hypothesis is that system is in an anomalous state.

This approach provides numerous advantages, both in terms of performance and accuracy. From a performance perspective, the monitoring and anomaly detection operates faster and more efficiently, since the volume of data operated upon by the current MSET-SPRT processing with the reduced dimensionality is far less than the volume of raw data from the sensors. In addition, the monitoring accuracy can improve since the current approach uses a single hypothesis instead of the large number of hypothesis of conventional MSET-SPRT approaches, which reduces the possibility of false positives and false negative inherent alternate approaches that require larger numbers of hypotheses.

The server 120 may then communicate with one or more applications 130. Such applications 130 may include, for example, functionality to implement inventory management, quality management, condition-based maintenance, and/or provide a visualization portal. Examples of these applications include, for example, Emergency Shutdown (ESD) systems, Supervisor Control and Data Acquisition (SCADA) systems, data analytics tools, BI (business intelligence) tools, CRM ("customer relationship management") products, ERP ("enterprise resource planning") products, enterprise marketing products, financials applications, and/or procurement applications. The application products are hosted on computing hardware operated by the cloud provider.

The server 120 may also manage the storage of the collected data into one or more datastores 140. The datastore 140 comprises any combination of hardware and software that allows for ready access to the data that is located at a computer readable storage device. For example, the datastore 140 could be implemented as computer memory operatively managed by an operating system. The data in the datastore 140 could also be implemented as database objects and/or files in a file system.

One or more users use one or more user stations 154 that interact with the system 100. The user station 154 comprises any type of computing station that may be used to operate or interface with the system, 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the architecture 100, such as a mouse or keyboard to manipulate a pointing object in a graphical user interface to generate user inputs.

Either the server 120 or the user at user station 154 may provide control signals to the gateway 102 to control the operation of the gateway 102 and/or the local devices 110a-c. The control signals may be used to control any operation necessary at the gateway and/or local device 110a-c, including for example, to update and provision control software on the gateway and/or to control operation of the local device.

Figure 2:
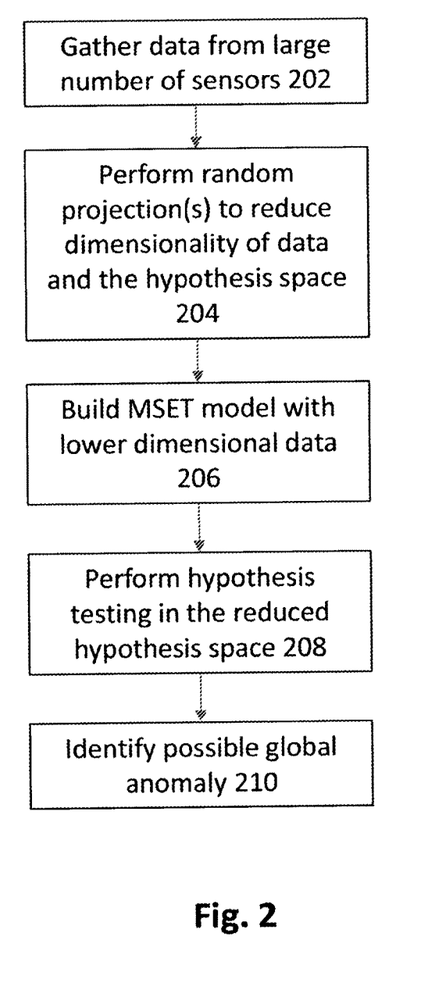
FIG. 2 shows a flowchart of an approach to implement some embodiments of the invention.

FIG. 2 provides a more detailed flowchart of an approach to implement some embodiments of the invention. At 202, data is gathered from the large number of sensors. The data may be gathered from any type of sensor that is capable of producing data. For example, the data may be gathered from IoT-based sensors that produce measurements of temperature, humidity, $CO_2$ levels, GPS, water level, water presence, electrical current/voltage, and/or light.

At step 204, random projection is used to reduce the dimensionality of the sensor data and to reduce the number of hypothesis tests from 1 per sensor to 1 global hypothesis in the case of high number of sensors. Random projection is a well-established dimensionality reduction technique with good statistical properties, and random projections are distance-preserving.

Figure 3:
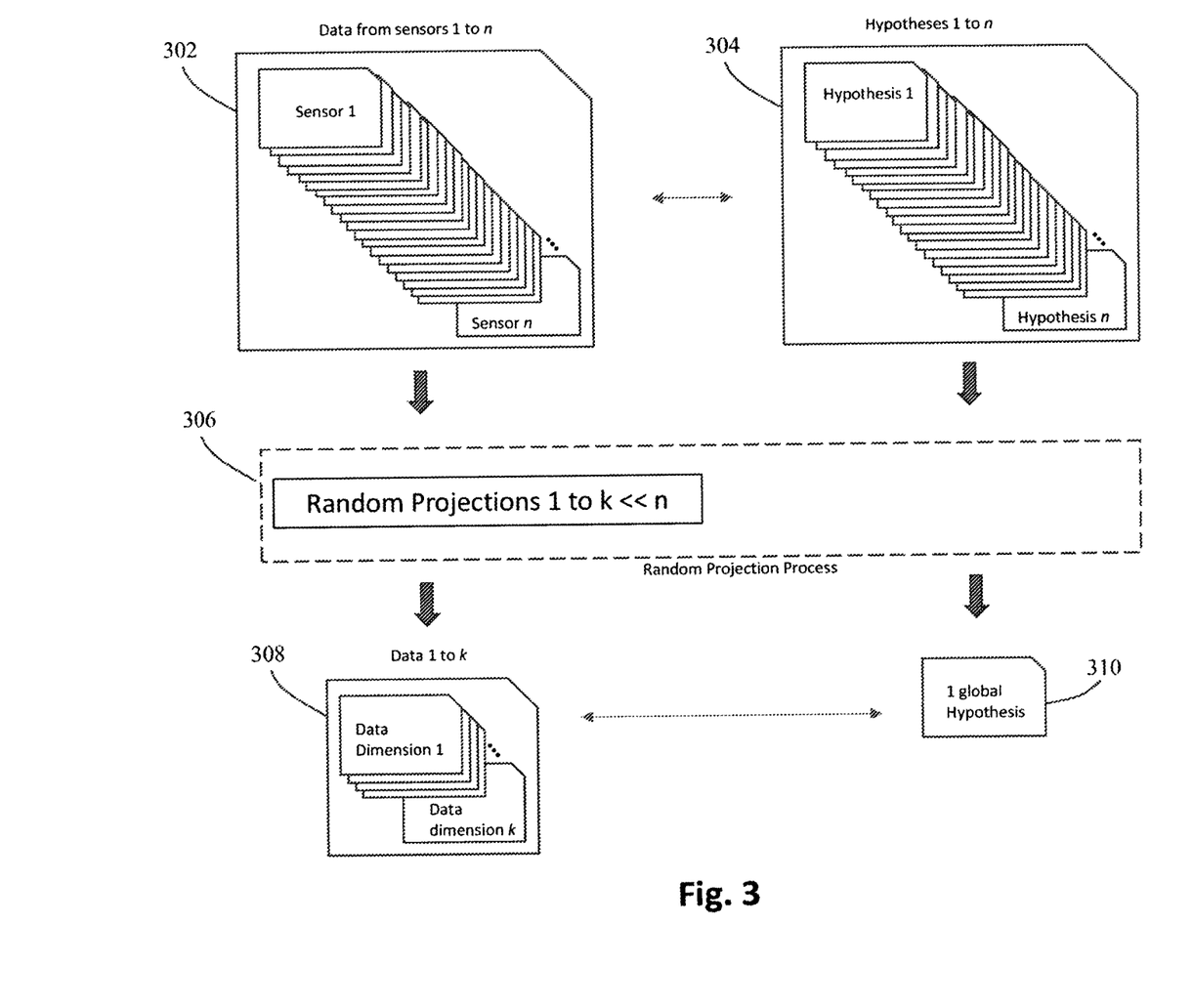
FIG. 3 provides an illustration of this process of using random projection to reduce the dimensionality of the sensor data and to reduce the number of hypothesis tests.

FIG. 3 provides an illustration of this process of using random projection to reduce the dimensionality of the sensor data and to reduce the number of hypothesis tests. As shown at the top of this figure, the raw data 302 from the sensors may comprise a volume of information, which includes essentially data from each and every one of the 1 to n sensors from which data is produced. Therefore, when there are large numbers of sensors, the sensor data may be considered to be very high dimensional.

As illustrated at the top of the figure, conventional MSET-SPRT processing subjects each of the sensors to its own respective hypothesis test. This means that a large number of sensors at 302 (sensors 1 to n) implies an equivalent large number of hypothesis tests at 304 (1 to n hypotheses tests).

Embodiments of the invention, at 306, processes the data from the 1 to n sensors to generated a reduced dimensionality of data 1 to k, where k is much less than n. This produces data 308, which can be seen it the figure as having much less data than the original data 302.

Any suitable approach can be taken to reduce the dimensionality of the original data. As previously noted, random projections is one approach that can be taken, where random projections is a well-established dimensionality reduction technique with good statistical properties that is distance-preserving such that examples close in the original space are close in the projected space, and distant examples in the original space are distant in the projected space. Other approaches may also be taken in other embodiments of the invention to reduce the dimensionality of the original data. For example, alternative embodiments may choose to employ techniques such as principle component analysis (PCA) or singular value decomposition (SVD).

In addition, the multiple 1 to n hypotheses at 304 can be discarded, and only a single hypothesis is needed at 310 in the current approach. This is because each random projection can be a sum of sensor values and, thus, is a snapshot of the entire sensor array. The random projections are photographs of the entire system from multiple perspectives. Individual sensor behavior is merged into a global picture. Thus, when the MSET methodology is applied to the random projections, the only question to be asked concerns global system health (or regional health if the sensors are divided into multiple regions). As such, only a single hypothesis at 310 remains to be tested on a system-wide basis for data that is representative of all of the sensors (rather than a separate hypothesis for each separate sensor). If the regional approach is used, then the hypothesis would be a region-based hypothesis, with a single separate hypothesis per each region (e.g., a single region hypothesis corresponding to the multiple sensors for that specific region).

Returning back to FIG. 2, the lower dimensional data is used to build a MSET model at step 206. At step 208, hypothesis testing is then performed in the reduced data space using just the single hypothesis. Based upon the results of the hypothesis testing, a determination is made at step 210 whether any global anomalies can be identified.

By using the MSET hypothesis testing approach on the projected data, each random projection becomes a Monte Carlo simulation of system health. Monte Carlo simulation is a method of risk analysis that uses draws from a probability distribution to provide values for analysis factors that are inherently uncertain. With all values provided, the outcome is known. With multiple draws, the outcome distribution is clarified and the risk can be assessed. The global health of the system to be measured is considered by a single number whose components are the sum of contributions from the sensor values. Whether a particular sensor contributes to the sum and what the sign of the contribution is uncertain. The way that this number has just been described is the way in which the random projections are constructed. This is a new interpretation of random projections as Monte Carlo simulation. The approach improves the scalability and robustness of the method.

Scoring may be employed as a methodology to perform the MSET-SPRT processing. Scoring data with MSET-SPRT models is similar to scoring with classification algorithms, except that the SPRT methodology relies on ordered data because it tracks gradual shifts over multiple MSET predictions. Unlike other classification models, an MSET-SPRT model has no obvious probability measure associated with the anomalous label for the record as a whole. However, the consolidation logic can produce a measure of uncertainty in place of probability. For example, if an alert is raised for 2 anomalies over a window of 5 observations, a certainty of 0.5 is reported when 2 anomalies are seen within the 5 observation window. The certainty increases if more than 3 anomalies are seen and decreases if no anomalies are seen.

Figure 4:
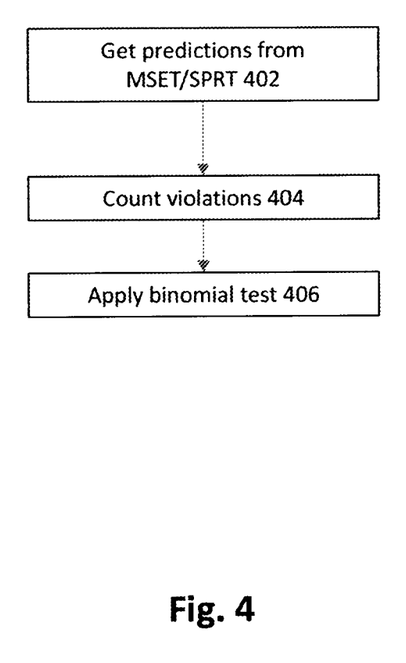
FIG. 4 is a flowchart that provides additional details regarding an approach to perform anomaly detection.

FIG. 4 is a flowchart that provides additional details regarding an approach to perform anomaly detection. At step 402, predictions are obtained from MSET/SPRT. The predictions pertain to predicted vectors based upon the MSET model that was generated using the reduced dimensional data.

At step 404, a count of violations can be obtained, and a binomial test can be applied at step 406 to identify any anomalies. For example, with n random projections, and a user-assigned value of an acceptable false positive rate, alpha, when k alarms are observed within a row of data, the probability of an anomaly is binomial with k successes in n trials given the probability of success on a given trial equal to alpha. An alert can be identified when the probability of obtaining k or more alarms in n trials is less than alpha. The potential anomalies can be summed within a window and used to perform a binomial test, e.g., where a MSET windowing approach is used, and summing is performed for the alarm values and the number of trials over the rows within a window are used to perform the binomial test.

Using this approach, performance can be improved by dimensionality reduction. In many cases, MSET requires 2 memory vectors per sensor. For example, in a system with 4800 sensors, MSET would require 9600 memory vectors. In many situations, this results in large build times and failed scoring due to insufficient process memory. Using the current inventive approach, build time is significantly lower and scoring can be completed successfully. In addition, the original MSET may generate high levels of false negatives, and capture low levels of true positives, whereas the inventive approach correlates to smaller levels of false negative and captures higher levels of true positives. Furthermore, highly accurate results can be obtained using the embodiments of the invention approach requiring only a sample of the rows, allowing for a further reduction in build time.

It is noted that the novel approach of using random projections to reduce the dimensionality of sensor data can be used in conjunction with conventional MSET-SPRT techniques. For example, one possible process may establish a threshold number of sensors, where if the number of sensors producing data for analysis is beneath the threshold number, then conventional MSET/SPRT is employed to analyze the sensors on an individualized basis, with a separate hypothesis for each sensor, and thus the ability to identify an anomaly on a sensor-by-sensor basis. However, if the number of sensors exceeds the threshold number, then random projections is employed to generate reduced dimensionality data, with the MSET model generated in a manner that encapsulates all the sensors, and a single hypothesis is used to identify possible anomalies on a global basis without identification of individual sensor-by-sensor anomalies.

Therefore, what has been described is an improved approach to use random projections to improve the use of MSET, e.g., for anomaly detection. This approach provides both performance and accuracy improvements. From a performance perspective, the monitoring and anomaly detection operates faster and more efficiently, since the volume of data operated upon by the current MSET-SPRT processing with the reduced dimensionality is far less than the volume of raw data from the sensors. In addition, the monitoring accuracy can improve since the current approach uses a single hypothesis instead of the large number of hypothesis of conventional MSET-SPRT approaches, which reduces the possibility of false positives and false negative inherent alternate approaches that require larger numbers of hypotheses.

The current use of random projections provides numerous improvements and advantages. First, whereas random projections have not previously been applied to MSET, the current approach uses random projections to improve the performance of MSET. Random projections, in the current MSET method are used to cap the quadratic driver of the computation to practical levels. Second, random projections are used to radically reduce the number of hypotheses, from one per sensor, to one in total. With random projections, the focus changes from per-sensor-health to global health. The ability to statistically discriminate depends on the amount of available data and the number of statistical questions asked. By reducing the number of hypothesis tests, the current approach reduces the data requirements without reducing the ability to statistically discriminate. In combination, these enhancements allow one to address problems that are out of reach of standard MSET. Third, random projections are interpreted as a form of Monte Carlo simulation. By interpreting random projections as Monte Carlo simulation, the current approach is able to make use of the Monte Carlo hypothesis testing methods for truncated SPRT. The interpretation of random projections as a Monte Carlo simulation is therefore new.

System Architecture

Figure 5:
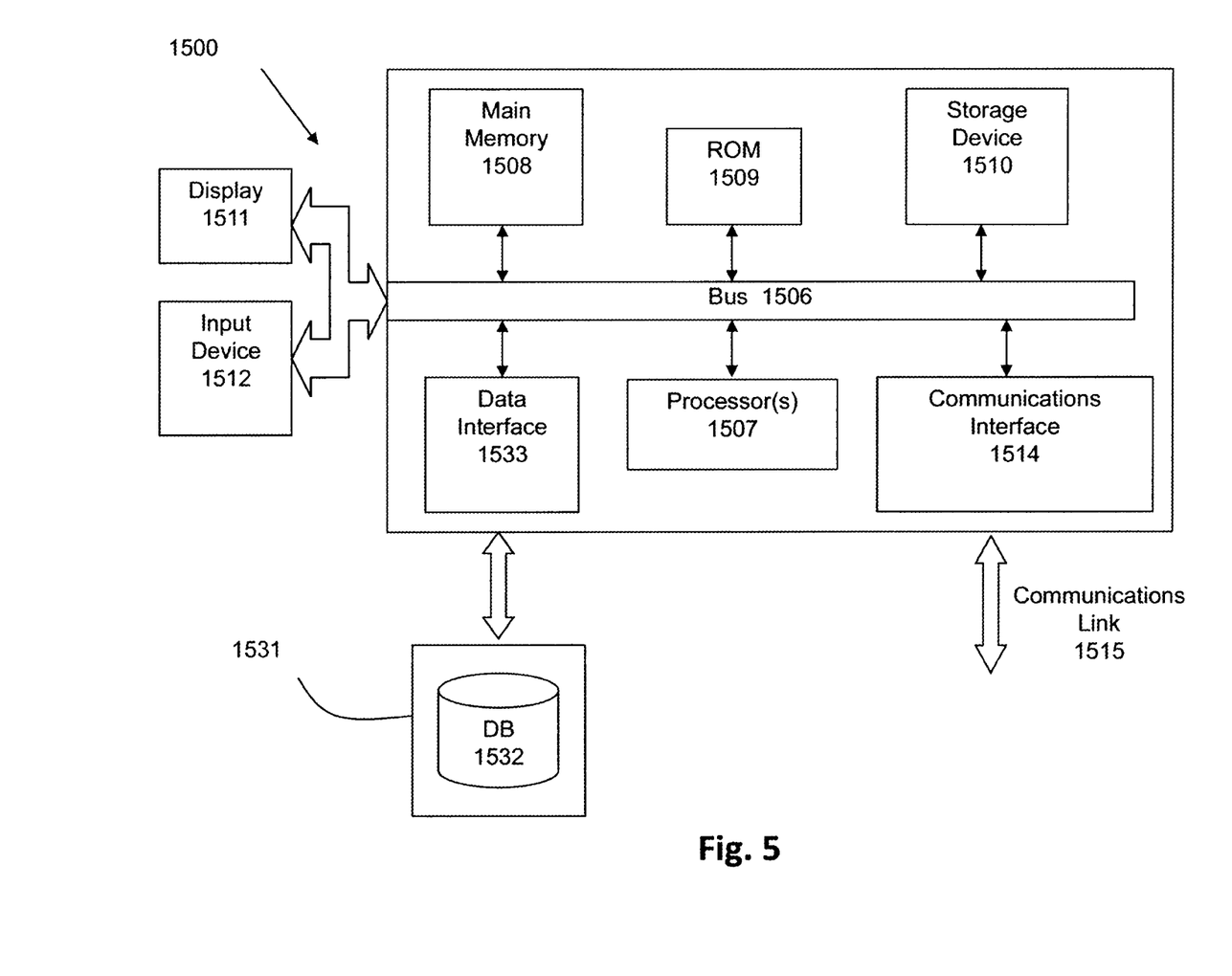
FIG. 5 is a block diagram of an illustrative computing system suitable for implementing an embodiment of the present invention.

FIG. 5 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to some embodiments of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1510 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. A database 1532 in a storage medium 1531 may be used to store data accessible by the system 1500.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 6:
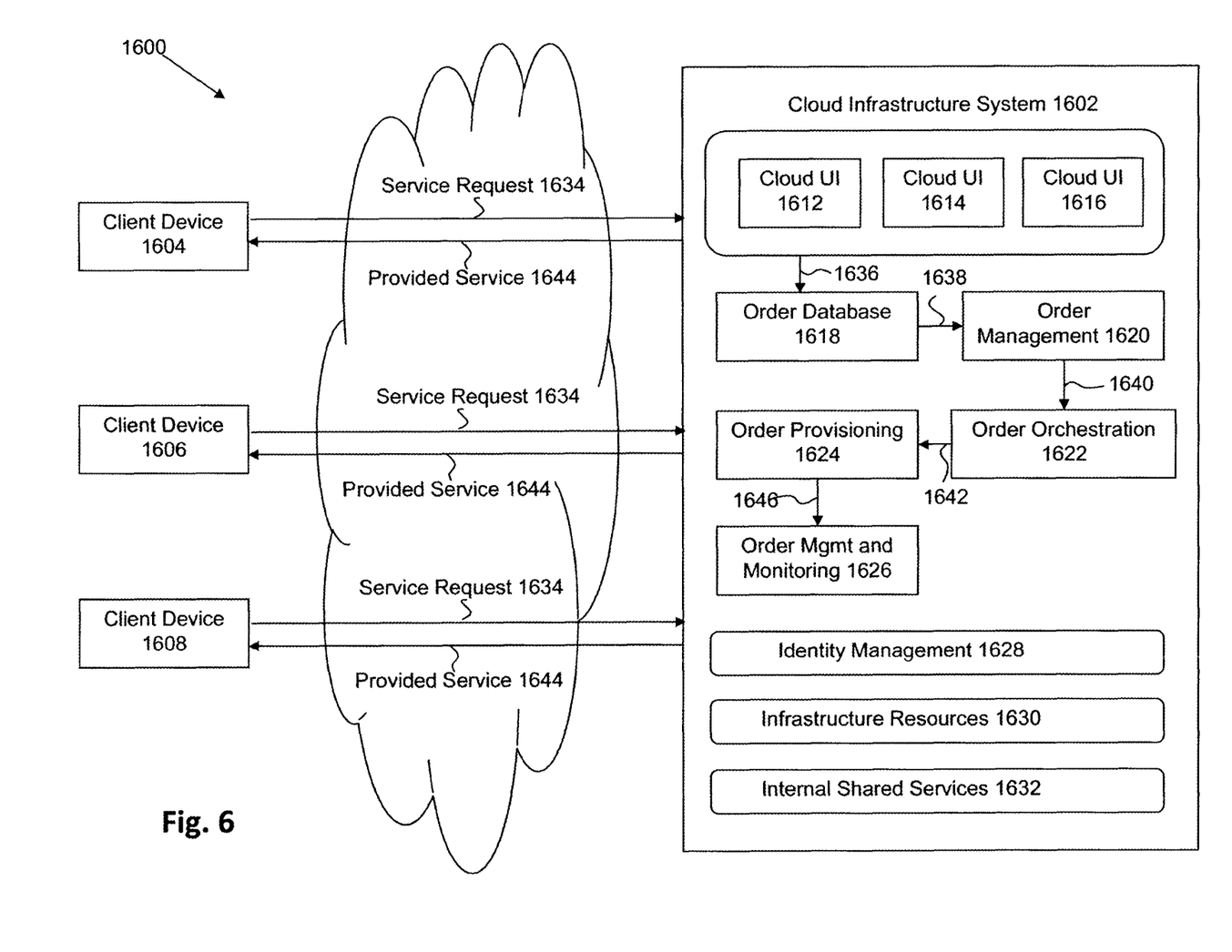
FIG. 6 is a block diagram of one or more components of a system environment in which services may be offered as cloud services, in accordance with an embodiment of the present invention.

FIG. 6 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application, or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the embodiment shown in the figure is only one example of a cloud infrastructure system that may incorporate an embodiment of the invention. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for FIG. 5. Although system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network familiar to those skilled in the art that can support data communications using any of a variety of commercially-available protocols. Cloud infrastructure system 1602 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner.

In various embodiments, cloud infrastructure system 1602 may be adapted to automatically provision, manage and track a customer's subscription to services offered by cloud infrastructure system 1602. Cloud infrastructure system 1602 may provide the cloudservices via different deployment models. For example, services may be provided under a public cloud model in which cloud infrastructure system 1602 is owned by an organization selling cloud services and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616. At operation 1636, the order is stored in order database 1618. Order database 1618 can be one of several databases operated by cloud infrastructure system 1618 and operated in conjunction with other system elements. At operation 1638, the order information is forwarded to an order management module 1620. In some instances, order management module 1620 may be configured to perform billing and accounting functions related to the order, such as verifying the order, and upon verification, booking the order. At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1602 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1602 may include an identity management module 1628. Identity management module 1628 may be configured to provide identity services, such as access management and authorization services in cloud infrastructure system 1602. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:

receiving sensor data from one or more sensors, wherein the sensor data is stored in one or more datastores;

generating, with a processor, a global or region aggregate by consolidating a per-feature statistical analysis for the sensor data into the global or region aggregate;

generating, with the processor, reduced dimensionality data by using random projection to reduce dimensionality of the sensor data into the global or region aggregate;

converting, with the processor, the reduced dimensionality data into a generated Monte Carlo estimate of the global or region aggregate; and performing anomaly identification of the sensor data from the one or more sensors by using a result of a single global or region hypothesis test, wherein the result is generated by applying the single global or region hypothesis test to the generated Monte Carlo estimate.

2. The method of claim 1, further comprising:

generating, with the processor, the global or region aggregate of the sensor data by using random projection to reduce the sensor data from individual data to the global or region aggregate by division of sensors into sensor regions; and building an MSET (Multivariate State Estimation Technique) on the random projection.

3. The method of claim 1, wherein the random projection corresponds to a fixed boundary Monte Carlo simulation that generates valid p-values for a binomial test of global or regional health.

4. The method of claim 1, wherein the global or region hypothesis test comprises a single hypothesis, wherein hypothesis testing generates at least a null hypothesis, corresponding to sensor values indicative of behavior of a system being normal, or an alternative hypothesis, corresponding to sensor values indicative of the behavior of the system being anomalous.

5. The method of claim 1, wherein Monte Carlo simulation is used to reduce both false alerts and failures to detect anomalous behavior.

6. The method of claim 1, wherein the sensor data comprises data from IoT sensors.

7. The method of claim 1, wherein principle component analysis or singular value decomposition is performed to reduce dimensionality of the sensor data to generate reduced dimensionality data.

8. The method of claim 1, wherein each random projection corresponds to a Monte Carlo simulation of system health.

9. The method of claim 1, wherein individual sensor behaviors from multiple sensors are merged into a MSET model generated by the reduced dimensionality data, and a single global or region hypothesis is tested to identify a global anomaly across the multiple sensors.

10. The method of claim 1, wherein the anomaly identification is performed by:
obtaining a prediction from MSET/SPRT;
counting violations; and
applying a binomial test.

11. The method of claim 1, wherein a threshold number is established such that the reduced dimensionality data is generated to perform the anomaly identification on a global basis when a number of sensors exceeds the threshold number, and full sensor data used to identify sensor-by-sensor anomalies when the number of sensors is lower than the threshold number.

12. A system, comprising:
a processor;
a memory for holding programmable code; and
wherein the programmable code includes instructions executable by the processor for receiving sensor data from one or more sensors, wherein the sensor data is stored in one or more datastores; generating, with a processor, a global or region aggregate by consolidating a per-feature statistical analysis for the sensor data into the global or region aggregate; generating, with the processor, reduced dimensionality data by using random projection to reduce dimensionality of the sensor data into the global or region aggregate; converting, with the processor, the reduced dimensionality data into a generated Monte Carlo estimate of the global or region aggregate; and performing anomaly identification of the sensor data from the one or more sensors by using a result of a single global or region hypothesis test, wherein the result is generated by applying the single global or region hypothesis test to the generated Monte Carlo estimate.

13. The system of claim 12, wherein the programmable code includes additional instructions for:

Generating, with the processor, the global or region aggregate of the sensor data by using random projection to reduce the sensor data from individual data to the global or region aggregate by division of sensors into sensor regions; and building an MSET (Multivariate State Estimation Technique) on the random projection.

14. The system of claim 12, wherein the random projection corresponds to a fixed boundary Monte Carlo simulation that generates valid p-values for a binomial test of global or regional health.

15. The system of claim 12, wherein the global or region hypothesis test comprises a single hypothesis, wherein hypothesis testing generates at least a null hypothesis, corresponding to sensor values indicative of behavior of a system being normal, or an alternative hypothesis, corresponding to the sensor values indicative of the behavior of the system being anomalous.

16. The system of claim 12, wherein Monte Carlo simulation is used to reduce both false alerts and failures to detect anomalous behavior.

17. The system of claim 12, wherein the sensor data comprises data from IoT sensors.

18. The system of claim 12, wherein principle component analysis or singular value decomposition is performed to reduce dimensionality of the sensor data to generate reduced dimensionality data.

19. The system of claim 12, wherein each random projection corresponds to a Monte Carlo simulation of system health.

20. The system of claim 12, wherein individual sensor behaviors from multiple sensors are merged into a MSET model generated by the reduced dimensionality data, and a single global or region hypothesis is tested to identify a global anomaly across the multiple sensors.

21. The system of claim 12, wherein the programmable code includes additional instructions for performing anomaly detection by:
obtaining a prediction from MSET/SPRT;
counting violations; and
applying a binomial test.

22. The system of claim 12, wherein a threshold number is established such that the reduced dimensionality data is generated to perform the anomaly identification on a global basis when a number of sensors exceeds the threshold number, and full sensor data used to identify sensor-by-sensor anomalies when the number of sensors is lower than the threshold number.

23. A computer program product embodied on a computer readable medium, the computer readable medium having stored thereon a sequence of instructions comprising:
   receiving sensor data from one or more sensors, wherein the sensor data is stored in one or more datastores;
   generating, with a processor, a global or region aggregate by consolidating a per-feature statistical analysis for the sensor data into the global or region aggregate;
   generating, with the processor, reduced dimensionality data by using random projection to reduce dimensionality of the sensor data into the global or region aggregate;
   converting, with the processor, the reduced dimensionality data into a generated Monte Carlo estimate of the global or region aggregate; and
   performing anomaly identification of the sensor data from the one or more sensors by using a result of a single global or region hypothesis test, wherein the result is generated by applying the single global or region hypothesis test to the generated Monte Carlo estimate.

24. The computer program product of claim 23, wherein the sequence of instructions further causes:
   generating, with a processor, the global or region aggregate of the sensor data by using random projection to reduce the sensor data from individual data to the global or region aggregate by division of sensors into sensor regions; and
   building an MSET (Multivariate State Estimation Technique) on the random projection.

25. The computer program product of claim 23, wherein the random projection corresponds to a fixed boundary Monte Carlo simulation that generates valid p-values for a binomial test of global or regional health.

26. The computer program product of claim 23, wherein the global or region hypothesis test comprises a single hypothesis, wherein hypothesis testing generates at least a null hypothesis, corresponding to sensor values indicative of behavior of a system being normal, or an alternative hypothesis, corresponding to sensor values indicative of the behavior of the system being anomalous.

27. The computer program product of claim 23, wherein the sequence of instructions further uses Monte Carlo simulation to reduce both false alerts and failures to detect anomalous behavior.

28. The computer program product of claim 23, wherein the sensor data comprises data from IoT sensors.

29. The computer program product of claim 23, wherein the sequence of instructions performs principle component analysis or singular value decomposition to reduce dimensionality of the sensor data to generate reduced dimensionality data.

30. The computer program product of claim 23, wherein each random projection corresponds to a Monte Carlo simulation of system health.

31. The computer program product of claim 23, wherein individual sensor behaviors from multiple sensors are merged into a MSET model generated by the reduced dimensionality data, and a single global or region hypothesis is tested to identify a global anomaly across the multiple sensors.

32. The computer program product of claim 23, wherein the sequence of instructions further performs anomaly detection by:
   obtaining a prediction from MSET/SPRT;
   counting violations; and
   applying a binomial test.

33. The computer program product of claim 23, wherein the sequence of instructions further establishes a threshold number such that the reduced dimensionality data is generated to perform the anomaly identification on a global basis when a number of sensors exceeds the threshold number, and full sensor data used to identify sensor-by-sensor anomalies when the number of sensors is lower than the threshold number.

34. A method, comprising:
   receiving sensor data from one or more sensors, wherein the sensor data is stored in one or more datastores;
   generating, with a processor, reduced dimensionality data by reducing dimensionality of the sensor data;
   constructing a MSET (Multivariate State Estimation Technique) model using the reduced dimensionality data;
   performing hypothesis testing using a single hypothesis, wherein a result is generated by applying the single hypothesis to the MSET model using the reduced dimensionality data; and
   performing anomaly identification using the result of the hypothesis testing.

35. The method of claim 34, wherein principle component analysis or singular value decomposition is performed to reduce the dimensionality of the sensor data to generate the reduced dimensionality data.

36. The method of claim 35, wherein each random projection corresponds to a Monte Carlo simulation of system health.

37. The method of claim 34, wherein individual sensor behaviors from multiple sensors are merged into the MSET model generated by the reduced dimensionality data, and the single hypothesis is tested to identify a global anomaly across the multiple sensors.

* * * * *